United States Patent
Vignali et al.

(12) 
(10) Patent No.: US 6,607,816 B1
(45) Date of Patent: Aug. 19, 2003

(54) FORMULATIONS BASED ON WATER SOLUBLE GOLD COMPOUNDS SUITABLE FOR COLORING CERAMIC MANUFACTURED ARTICLES

(75) Inventors: Graziano Vignali, Sasso Marconi (IT); Fabrizio Guizzardi, Bologna (IT)

(73) Assignee: Graziano Vignali, Sasso Marconi (IT)

( * ) Notice: Subject to any disclaimer, the term of this patent is extended or adjusted under 35 U.S.C. 154(b) by 0 days.

(21) Appl. No.: 09/763,110

(22) PCT Filed: Aug. 19, 1999

(86) PCT No.: PCT/EP99/06086
§ 371 (c)(1),
(2), (4) Date: Feb. 16, 2001

(87) PCT Pub. No.: WO00/10941
PCT Pub. Date: Mar. 2, 2000

(30) Foreign Application Priority Data

Aug. 21, 1998 (IT) .......................................... MI98A1913

(51) Int. Cl.$^7$ ................................................. B32B 3/06
(52) U.S. Cl. ................. 428/307.3; 428/40.4; 428/41.7; 427/147; 427/229; 427/256; 427/385.5
(58) Field of Search ............................. 428/307.3, 41.7, 428/40.4; 427/147, 229, 256, 385.5

(56) References Cited

U.S. PATENT DOCUMENTS 5,545,452 A * 8/1996 Schulz et al. ............... 428/41.7

FOREIGN PATENT DOCUMENTS

| DE | 43 20 072 C1 | 6/1993 |
|---|---|---|
| DE | 195 46 325 | 6/1997 |
| EP | 514073 A2 * | 5/1992 |
| EP | 44 05 932 | 5/1995 |
| EP | 97/21646 | 12/1995 |
| EP | 97/38952 * | 10/1997 |

OTHER PUBLICATIONS

Enzyklopadie der Technischen Chemie: pp 837–838 (with partial English Translation).

* cited by examiner

*Primary Examiner*—Leszek Kiliman
(74) *Attorney, Agent, or Firm*—Hedman & Costigan, P.C.

(57) ABSTRACT

Composition whereby ceramic manufactured articles are colored in shades from pink to violet, such composition includes of a monovalent gold thiolate water solution or mixture of water with a water soluble organic solvent according to the following formulas Au—S—R—X and Au—S—R—H, where R stands for a linear or branched bivalent radical of aliphatic or aromatic or cycloaliphatic or heterocyclic type optionally with substituents, such as for example aminic, amidic, hydroxylic, carboxylic, hydrocarbylic or carbonylic groups or CONH—, in the chain; X stands for a monovalent group selected out of —COOH, $SO_2OH$, —OH, —$CONH_2$, —$NH_2$; O—P(O)(OH)$_2$, in which H atoms may be replaced by alkyl groups and wherein acid group may be salified with amines or alkaline or alkaline earth metals and basic groups may optionally be salified with organic acids

13 Claims, No Drawings

FORMULATIONS BASED ON WATER SOLUBLE GOLD COMPOUNDS SUITABLE FOR COLORING CERAMIC MANUFACTURED ARTICLES

FIELD OF THE INVENTION

The present invention relates to compositions suitable for colouring ceramic manufactured articles and to the relevant colouring process.

In particular, the compositions of the invention consist of water solutions or solutions of water and water-miscible solvents, of gold organic complexes compatible with other colouring cations optionally present in the solution releasing low quantities of corrosive vapours during the firing cycle.

Said solutions allow the obtainment of ceramic manufactured articles in shades from pink to purple to violet after a firing cycle ranging from 750° C. to 1,300° C.

STATE OF THE ART

The use of coloured ceramic manufactured articles as well as the compositions and process adopted to obtain the relevant colours have been known since long. One of the methods most commonly used consists in the addition of powdered pigments, in particular inorganic oxides and mineral colouring matters, to the ceramic mixture (vitrified stoneware) before firing. The ceramic manufactured article is thus coloured through its whole thickness, although with large consumption of colouring matter, which is the most expensive component.

According to a process used, the surface of the ceramic material is caused to absorb, either after partial firing (as disclosed e.g. in German patent 2,012,304) or simply after moulding and before firing (as disclosed e.g. in Swiss patent 575,894), a water solution of inorganic salts or metal complexes (as disclosed e.g. in Sprechsal, vol. 119, No. 10, 1986, in EP 0704411 and in patent PCT, WO 97/38952), which become stable colours at high temperature during the ceramic firing cycle.

The water solution is applied to the ceramic material before final firing. This process is particularly advantageous because it allows the colouring of very thin layers: therefore, it is widely used for flat manufactured articles (such as e.g. floor and wall tiles).

Another problem to be solved when using colours in a water solution is the obtainable depth of colour penetration into the ceramic material. In fact, it was experimentally found that the depth of penetration depends on several parameters, such as the viscosity and surface tension of the colouring solution, the application temperature, the quantity of water optionally sprayed on the manufactured article once the colouring solution has been applied. The water solution is applied to the ceramic manufactured article by immersion, spraying, disk, and silk-screen techniques.

Of cardinal importance is the application technique: in particular, the quantity of colouring solution that may be applied by disk and spraying techniques is as high as 400 to 600 g/m2; by silk-screen type techniques it usually amounts to 100 to 200 g/m2 and sometimes even to 400 g/m2, when thickened screens made of a small number of threads are used.

Silk-screen type techniques are very much in demand, being the only techniques allowing graphic decorations and drawings, which otherwise cannot be obtained, and requiring lower quantities of colouring matter. When said techniques are used, the colouring solutions are to be thickened with appropriate thickening agents, e.g. modified glucomannans, starch and modified starch derivatives, cellulose and modified cellulose derivatives, or other polymeric substances, soluble or dispersible in a water solution.

Colour penetration into the ceramic material before firing can be obtained by spraying relatively high quantities of water on the manufactured article after application of the colouring solution. However, the resulting colours are less intense than those obtained using other techniques.

Colour penetration into the material is particularly important in the case of "smoothed" vitrified stoneware tiles.

The term "smoothed" means that the vitrified stoneware surface has been abraded with diamond wheels by 0.8 to 1.5 mm and subsequently smoothed or polished with appropriate felt until obtaining a glassy surface.

It follows that colour penetration into stoneware articles to be smoothed after firing must reach a depth of 1.6 mm min.

Other methods have been developed for the smoothing of very thin (1 to 10 0) surface layers of the manufactured article.

PRIOR ART

The use of water solutions of gold compounds for the colouring also in-depth of ceramic manufactured articles is well known. The compounds disclosed in German patent 4,320,072 for said application substantially are gold chlorides also reported in the preceding literature (cf. "Encyclopedia der technischen Chemie", F. Ullmann, 1929, vol. 4, pp. 837–838). However, the gold chloride solution suffers from the inconvenience of being strongly acid, as it contains hydrochloric acid. In the absence of excess hydrochloric acid, the solution is unstable and the gold compound hydrolyses easily with formation of insoluble compounds.

It follows that the solution is corrosive and impairs the apparatus used. In particular, in the case of silk-screen type technique, it rapidly impairs the printing screen.

WO 97/21646 discloses the use of gold sodium thiosulphate solutions, $Na_3Au(S_2O_3)_2$, stabilised with sodium sulphite, for ceramic surfaces colouring by water solution absorption.

From the compositions of solutions 1, 2, and 3 described therein, it is possible to calculate that 4.7 g $SO_2$ or 5.88 g $SO_3$, or an intermediate value in the case of mixtures thereof is released per g Au deposited on the surface.

In both cases (use of gold chloride and gold thiosulphate), high amounts of strongly corrosive vapours rapidly impairing the heater metal structures, are released. Therefore, vapours are to be abated to prevent the emission of same into the environment.

The use of precious metals water solutions in high concentrations, in the form of thiol derivatives, to obtain thin metal films for decorative purposes, e.g. for dishes, or for electronic purposes, e.g. for printed circuits, is already known.

The following are examples of said use:

1. U.S. Pat. No. 5,545,452 discloses the use of Au thiolates water solutions with a metal content of 2 to 25% by wt. (column 3, rows 10 to 20) to obtain thin metal films for decorative purposes (column 1, rows 38 to 40);
2. EP No. 514,073, like the U.S. patent above, discloses the use of thiolates water solutions to obtain thin films made of Au or other precious metals to decorate the outer surface, and not the inside, of baked ceramic manufactured articles.

Technical Problem

Considering that it is very simple to colour ceramic materials by disk, spraying and silk-screen techniques, the ceramic industry is highly interested in the possibility of using colouring water solutions based on gold to be applied by said techniques, and offering the advantage of releasing the lowest possible quantity of very noxious or corrosive vapours in the heater;

being compatible with water solutions of organic derivatives of other cations used for the superficial and in-depth colouring of ceramic manufactured articles.

Therefore, it is an object of the present invention to provide colouring formulations in the form of water solutions, which release low quantities of corrosive vapours ($\leq 2$ g $SO_2$/g Au deposited);

are compatible with water solutions of organic derivatives of other cations used for the superficial and in-depth colouring of ceramic manufactured articles;

colour the ceramic manufactured articles at their surface and to a depth of at least 1 mm.

The Applicant, who has full-fledged experience in the production and sale of colouring matters for ceramic tiles, has now found that water solutions or water mixtures with alcohols or other water-miscible organic solvents, of monovalent gold organic derivatives, can be used to obtain-after firing-colour shades varying from pink to purple to violet on manufactured articles consisting of a conventional ceramic mixture.

The water or hydroalcoholic solutions being an object of the present invention are particularly useful for colouring tiles of vitrified stoneware, either at their surface or to a depth of 1 to 3 mm from their surface.

In-depth colouring is essential for maintaining the manufactured article decoration after smoothing.

It is, therefore, a fundamental feature of the present invention to use water solutions or water mixtures with hydrophilic organic solvents, of gold organic complexes, which are compatible with derivatives of other cations and release low quantities of corrosive vapours ($\leq 2$ g $SO_2$/g Au deposited).

Said solutions are used to treat ceramic articles before firing. This makes it possible, after firing, to obtain pink, purple and violet coloured articles, when solutions contain gold only, or new colour shades when solutions are mixed with derivatives of one or several of the following cations: Fe, Cr, Co, Mn, Cu, Ru, Pd, Zr, V, Ni, Sb, W, Zn, Sn.

The gold compounds that may be used according to the present invention belong to the class of monovalent gold thiolates, wherein Au is bound to an S atom, and are substantially represented by the following general formulas:

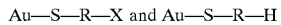

Au—S—R—X and Au—S—R—H where R stands for a linear or branched bivalent radical of aliphatic or aromatic or cycloaliphatic or heterocyclic type, optionally with substituents, such as for example aminic, amidic, hydroxylic, carboxylic, hydrocarbylic or carbonylic groups or CONH—, in the chain;

X stands for a monovalent group selected out of —COOH, $SO_2OH$, —OH, —$CONH_2$, —$NH_2$; —O—P(O)(OH)$_2$, in which H atoms may be replaced by alkyl groups and wherein acid groups may be salified with amines or alkaline or alkaline earth metals and basic groups may optionally be salified with organic acids.

In particular, monovalent Au thiolates to be used according to the present. invention may be in the form of alkaline, alkaline earth metal salts or of variously substituted amines.

The water solutions of Au compounds according to the invention are stable, substantially neutral and release a quantity of corrosive vapours of 2 g $SO_2$ max./g Au deposited on the manufactured article surface to be coloured.

Said solutions are used in quantities corresponding to 0.1 to 20 g Au (as element) per m2 of surface to be coloured.

By way of example, the gold thiolates that may be used according to the invention derive from:

(N) acetylcysteine:

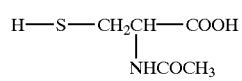

4-mercaptopyridine:

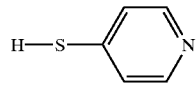

2-mercaptoacetyl-glycine: H—S—$CH_2$—CO—NH—$CH_2$COOH 2-mercaptopropionyl-glycine:

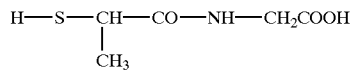

(d,I) mercaptosuccinic acid:

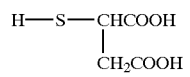

4,6-dihydroxy-2-mercapto-pyrimidine:

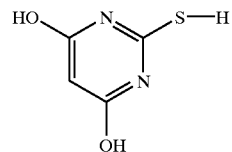

2-mercapto benzimidazole:

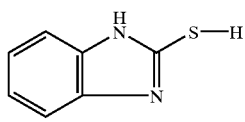

cysteine:

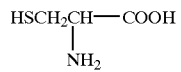

2-mercaptopropionic acid:

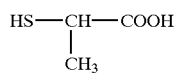

The compatibility of the gold thiolates according to the invention with the ceramic colouring systems based on metallic compounds (in particular of Fe, Ni, Cr, Co, Sn, Mn, Cu, Ru, Pd, Zr, V, Sb, W, Zn, Sn) in aqueous solutions has been ascertained through stability tests of the aqueous solutions containing beside Au thiolate also one or more compounds of the above mentioned metals and also through ceramic coloration tests by the same aqueous solutions after ageing. Unforeseeable very valuable colours were obtained.

Gold thiolates to be used according to the invention may generally be prepared by causing an Au(III), in the form of a tetrachloroauric acid, to react in water solution with a thioether $S(R')_2$, giving the reduction of Au(III) to Au(I), and then with the desired thiol HSR" (R"=—RX or —RH as per the general formulas shown above):

This method, described in *Inorganic Synthesis*, 23 (1985) pp. 191–195, is based on some reactions reported therein.

A typical process for applying colouring compositions according to the invention consists in the following steps:
 a) drying at 100° C. of the article to be coloured to a water residue of 0.5% by wt. max.;
 a.1) pre-treatment, if any, of the dried article with water up to a max. quantity of 300 g/m2 manufactured article;
 b) treatment of the pre-treated article with a water solution of the colouring composition in a quantity of 30 to 600 g/m2 of the final coloured surface;
 b.1) post-treatment, if any, of the treated article with water up to a max. quantity of absorbed water of 300 g/m2 ceramic manufactured article;
 c) equalisation of the post-treated article at room temperature for 8 hours to homogenise the solution absorption;
 d) oven firing according to the usual ceramic cycle at a temperature of 1,000 to 1,300° C.

The concentration of Au thiolate solution to be used according to the invention generally ranges from 0.1 to 2% Au (expressed as element).

Some examples of the colours obtained by experimental runs are shown in the Table 1 reported hereinafter.

All runs were carried out on the basis of the following process:
 1) drying at 1000° C. of two 33×33 cm supports made of mixture A to a water residue of 0.5% by wt. max.;
 2) supports cooling to room temperature;
 3) deposition of 0.4 g of each solution on 10 cm2 of surface of each support;
 4) supports equalisation at room temperature for 2 hrs and for additional 2 hrs in a thermoventilated oven at 600° C. to homogenise the solutions absorption;
 5) oven firing according to the usual ceramic cycle;
 6) removal of a surface layer (0.8–0.9 mm) and smoothing;
 7) colour detection on non-smoothed and smoothed support;
 8) non-smoothed support cutting and penetration depth detection.

TABLE 1

| Ex. n° | Complexing agent % element | Colour before smoothing | Colour after smoothing | Penetration (mm) |
|---|---|---|---|---|
| 1 | D,L mercaptosuccinic acid, 0.4% gold | Parma red | Pink | 1.2 |
| 2 | acetylcysteine, 0.4% gold | Pink | Light pink | 2 |
| 3 | thiolactic acid, 0.4% gold | Pink | Light pink | 2 |
| 4 | cysteine, 0.4% gold | Parma red | Pink | 1.4 |

The composition of the ceramic mixture used is as follows (% by wt.) $SiO_2$ 64.4%; $Al_2O_3$ 21.8%; $K_2O$ 3.8%; $Na_2O$ 0.8%; CaO 0.6%; MgO 0.1%; $TiO_2$ 0.3%; Fe2O3 0.2%; $ZrSiO_4$ 5%; $H_2O$ to 100%.

Colours are as per the Colour Atlas.

EXAMPLE 5

Compatibility of Some Au Thiolates With Other Cations

Compatibility tests were carried out with the following water solutions: Au acetylcysteinate prepared with the method disclosed in the following at page 11, line 6 and diluted up to 0.4% Au, Au mercaptosuccinate (0.4% Au), cobalt ammonium citrate (2% Co), Ni ammonium citrate (2% Ni); chromium ammonium citrate (2% Cr), iron ammonium citrate (Fe 2%), tin glycolate (Sn 2%).

The mixtures consist of Au derivative solution (50%) and of another cation solution (50%).

The results obtained, after the days reported below, are as follows:

|    | Au acetylcysteinate | Au mercaptosuccinate |
|---|---|---|
| Co | 30 days, clear solution<br>60 days, clear solution colour turned from reddish violet to wine red | 30 days, clear solution<br>60 days, clear solution<br>— |
| Ni | 30 days, clear solution<br>60 days, clear solution | 30 days, clear solution<br>60 days, clear solution |
| Cr | 30 days, clear solution<br>60 days, slightly opaque sol. | 30 days, clear solution<br>60 days, slightly opaque sol. |
| Fe | 30 days, clear solution<br>60 days, clear solution | 30 days, clear solution<br>60 days, clear solution |
| Sn | 30 days, clear solution<br>60 days, clear solution | 30 days, clear solution<br>60 days, clear solution |

EXAMPLE 6

The compatibility of some Au thiolate according to the invention with other colouring cations has been tested in comparison with two Au compounds of the prior art, namely $NaAuCl_4$ and gold-sodium thiosulphate $Na_3Au(S_2O_3)_2$. The obtained results are reported in Tables 3 and 4.

The tested products in form of aqueous solutions containing 1% by w. Au are prepared as follows.

Product (1) Au Thiolacetate (Au-TL/3)

30 g aqueous solution of tetrachloroauric acid (corresponding to 1 g Au) is added with aqueous solution of NaOH up to a pH of 8 (solution A). Thiolactic acid 1.65 g is dissolved in 30 g $H_2O$ and added with $NH_4OH$ aqueous solution 30% by w. up to a pH=7 (solution B). The solution B is added to the solution A, then the mixture is added with $NH_4OH$ up to pH 9 and with $H_2O$ up to a total weight of 100 g.

Product (2) Au Sodium Thiosulphate (Au-Bk.Giulini)

Comparison Test.

In 91.6 g of $H_2O$ are dissolved 1.7 g $Na_3Au(S_2O_3)_2$ and 6.7 g of Na sulphite (molar ratio $Au/Na_2SO_3=0.9/10$) as disclosed by WO97/21646 in Table 3. This ratio is the best as it regards the stabilization of the solution as declared by the Applicant: no precipitate occurs in the solution when it comes in contact with a piece of metal.

Product (3) Au Acetylcysteine (Au/CST)

30 g of aqueous solution of tetrachloroauric acid (corresponding to 1 g Au) are added with NaOH aqueous solution up to a pH of 8 (solution A). N-acetylcysteine 5.1 g in 30 g $H_2O$ are added with $NH_4OH$ aqueous solution 30%, up to a pH of 7 (solution B). The solution B is added to the solution A, then the mixture is added with $NH_4OH$ up to pH 9.5 and with $H_2O$ up to a total amount of 100 g.

Product (4) Au Acetylcysteine (Au-CST/9)

30 g of aqueous solution of tetrachloroauric acid (≈1 g Au) are added with NaOH aqueous solution up to a pH 8 (solution A). N-acetylcysteine 5.1 g in 30 g $H_2O$ are added with NaOH aqueous solution up to a pH 7 (solution B). The solution B is added to the solution A, then the mixture is added with NaOH up to pH 9 and with $H_2O$ up to a total amount of 100 g.

Product (5) Au Acetylcysteine (Au-CST/2)

30 g of aqueous solution of tetrachloroauric acid (1 g Au) are added with NaOH aqueous solution up to a pH of 8 (solution A). N-acetylcysteine 2.55 g in 30 g $H_2O$ are added with $NH_4OH$ 30% aqueous solution up to a pH 7 (solution B). The solution B is added to the solution A, then the mixture is added with $NH_4OH$ up to a pH 9.5 and with $H_2O$ up to a total amount of 100 g.

Product (6) $NaAuCl_4$ (Au—Cl)

Comparison Test.

30 g of aqueous solution of tetrachloroauric acid (≈1 g Au) are added with NaOH aqueous solution up to a pH of 2.5 and with $H_2O$ up to a total amount of 100 g.

Product (7) Au Acetylcysteine (Au-CST/10)

30 g of aqueous solution of tetrachloroauric acid (≈1 g Au) are added with NaOH aqueous solution up to a pH of 8 (solution A). N-acetylcysteine 2.55 g in 30 g $H_2O$ are added with NaOH aqueous solution up to a pH 7 (solution B). The solution B is added to the solution A, then the mixture is added with NaOH up to a pH of 9.5 and with a $H_2O$ up to a total amount of 100 g.

In the following Table 2 are reported the tested products with the neutralizing agent used (NaOH or $NH_4OH$) and the molar ratio between Au and $SO_2$ (or $SO_3$) developed during the ceramic firing of the treated manufactured articles.

The Au acetylcysteine solutions products 3 and 4 have been prepared using an excess of acetylcysteine and consequently these solutions show a content of S higher then in the products 5 and 7. The use of an excess of acetylcysteine affords an higher stability of the Au-acetylcysteine solution.

TABLE 2

| Product ref n° | Au compound | Neutralizing agent | $Au/SO_2$ |
|---|---|---|---|
| 1 Au-TL/3 | Au thiolactate | $NH_4OH+NaOH$ | 1:1 |
| 2 Au-Bk.Giulini | Na-Au thiosulphate stabil. $Na_2SO_3$ | — | 1:4.7 |
| 3 Au/CST | Au acetylcysteine | $NH_4OH+NaOH$ | 1:2 |
| 4 Au-CST/9 | " | NaOH | 1:2 |
| 5 Au-CST/2 | " | $NH_4OH+NaOH$ | 1:1 |
| 6 Au-Cl | $NaAuCl_4$ | — | — |
| 7 Au-CST/10 | Au acetylcysteine | NaOH | 1:1 |

The tests reported in the following tables 3 and 4 have been carried out with solutions consisting of mixtures of Au derivative solution (50%) and of other cations solutions (50%)

TABLE 3

Comparative tests for Au-acetylcysterine and Au-thiolactate, reference product Na—Au thiosulphate (Au-Bk.Giulini)

| Aqueous sol. % cations and pH | Au-TL/3 (1) | Au-Bk.Giulini (2) | Au-CST (3) | Au-CST/9 (4) |
|---|---|---|---|---|
| Co amm. Citrate Co = 8% pH 7.5–8.5 | 60 d: OK | 9 d: little XXX on the bottom<br>16 d: many XXX of both Au and Co, on the bottom and on the wall | 60 d: OK | 60 d: OK |
| Co amm. Citrate Co = 4% pH 7.5–8.5 | 60 d: OK | 23 d: some very little XXX<br>30 d: many XXX (ocher colour)<br>60 d: many XXX of Au and Co on the bottom and on the wall | 60 d: OK | 60 d: OK |
| NaSb tartrate Cr acetate Sb = 12.8% Cr = 1.8% pH 4.5–5 | 60 d: OK | 8 d: little greyish sediment on the bottom<br>15 d: little greyish sediment on the bottom and on the wall<br>22 d: Au sed. on the | 60 d: OK | 60 d: OK |

TABLE 3-continued

Comparative tests for Au-acetylcysterine and Au-thiolactate, reference product Na—Au thiosulphate (Au-Bk.Giulini)

| Aqueous sol. % cations and pH | Au-TL/3 (1) | Au-Bk.Giulini (2) | Au-CST (3) | Au-CST/9 (4) |
|---|---|---|---|---|
| | | bottom and on the wall | | |
| NaSb tartrate Cr acetate Sb = 6.4% Cr = 0.9% pH 4.5–5 | 60 d: OK | 60 d: little dark sed. on the bottom | 60 d: OK | 60 d: OK |
| Cr amm. Citrate Cr = 6.8% pH 7–8 | 60 d: OK | 60 d: OK | 60 d: OK | 60 d: OK |
| Cr amm. Citrate Cr = 3.4% pH 7–8 | 60 d: OK | 60 d: OK | 60 d: OK | 60 d: OK |
| Ni amm. Citrate Ni = 7.6% pH 7–8 | 60 d: OK (transparent greenish sol.) | 60 d: OK (transparent greenish sol.) | 60 d: OK (dark sol.) | 60 d: OK (dark sol.) |
| Ni amm. Citrate Ni = 3.8% pH 7–8 | 60 d: OK (transparent greenish sol.) | 60 d: OK (transparent greenish sol.) | 60 d: OK (dark sol.) | 60 d: OK (transparent green sol.) |
| Cu amm. Citrate Cu = 8% pH 7.5–8.5 | 60 d: OK | 60 d: little sediment on the bottom | 60 d: OK | 60 d: OK |
| Fe amm. Citrate Fe = 9.8% pH 4.5–5 | 60 d: OK | 60 d: OK | 60 d: OK | 60 d: OK |
| Fe amm. Citrate Fe = 4.9 pH 4.5–5 | 60 d: very light, black dust | 22 d: very light, black dust = 29 d 60 d: very light, black dust | 60 d: OK | 60 d: OK |
| Fe CTR/13 (see foot note) | 60 d: OK | 8 d: sediment on the bottom | 60 d: OK | 60 d: OK |
| Sn glycolate Sn = 7.6% pH 4.5–5 | 60 d: OK | 60 d: very light black sediment on the bottom | 60 d: OK | 60 d: sol. is gelled on all the wall and on the bottom of the test tube, but it is yet liquid and transparent |
| Mn amm. Citrate Mn = 4.5% pH 7.8–8.8 | 60 d: OK | 8 d: white precipitate on the bottom and on the walls | 60 d: OK | 60 d: OK |
| Sodium metavandate V = 6.8% pH 9.5–10 | 60 d: OK | 8 d: very light white sediment (= 15 d = 22 d) 29 d: bright, light sediment | 15 d: some very little black mote 22 d: some very little black mote 29 d: some black extended XXX (little rods) = 60 d | 60 d: OK |
| V glycolate V = 8% pH 5–5.5 | 60 d: OK | 29 d: very light black dust 60d: ppt Au and V | 60 d: OK | 60 d: OK |
| Ru glycolate Ru = 6% pH 2–2.5 | 28 d: ppt of Au on the wall 60 d: wall and bottom of the test tube coated by Au | 7 d: remarkable black sediment 14 d: remarkable black sediment on the bottom and on the wall | 60 d: OK | 7 d: light black precipitate 14 d: very light black precipitate = 60 d |

TABLE 3-continued

Comparative tests for Au-acetylcysterine and Au-thiolactate, reference product Na—Au thiosulphate (Au-Bk.Giulini)

| Aqueous sol. % cations and pH | Au-TL/3 (1) | Au-Bk.Giulini (2) | Au-CST (3) | Au-CST/9 (4) |
|---|---|---|---|---|
| Ru glycolate Ru = 3% pH 2–2.5 | 28 d: very light coat on the wall 60 d: Au on the wall and on the bottom | 7 d: remarkable black precipitate. On the wall noticeable sediment of Au | 60 d: OK | 7 d: very light black precipitate 14 d: very light black precipitate = 60 d | d=days
XXX=crystals
ppt=precipitate sol.=solution
Fe citr/13=10 g hydrate iron citrate Aldrich (Fe 18÷19%) in 20 g $H_2O$ are added with 10 g of $NH_4OH$ 30%, find pH=7; Fe=4.5÷4.75% by w.

TABLE 4

Comparative tests for Au-acetylcysterine: reference product Na Au $Cl_4$ (Au—Cl)

| Aqueous Sol. % cations and pH | Au-CST/2 (5) | Au—Cl (6) | Au-CST/10 (7) |
|---|---|---|---|
| Co amm. Citrate Co = 8% pH 7.5–8.5 | 60 d: OK | 9 d: very light sed. sol. of violet colour 16 d: as 9 d 23 d: light sed. = 30 d = 60 d | 60 d: OK |
| Co amm. Citrate Co = 4 pH 7.5–8.5 | 60 d: OK | 9 d: OK sol. of violet colour 16 d: OK (violet sol.) 23 d: very light sed. 30 d: light sed. Au = 60 d | 60 d: OK |
| NaSb tartrate Cr acetate Sb = 12.8% Cr = 0.9% pH 4.5–5 | 60 d: OK | 8 d: black ppt on the bottom 15 d: black ppt on the bottom and very weak on the wall = 60 d | 60 d: OK |
| NaSb tartrate Cr acetate Sb = 6.4% Cr = 0.9% pH 4.5–5 | 60 d: OK | 8 d: black ppt on the bottom 15 d: black ppt on the bottom and very light on the wall = 60 d | 60 d: OK |
| Cr amm. Citrate Cr = 6.8% pH 7–8 | 60 d: OK | 8 d: light brownish sed. (from the colour it seems Au) 15 d: brownish sed. | 60 d: OK |
| Cr amm. Citrate Cr = 3.4% pH 7–8 | 60 d: OK | 8 d: light brownish sed. (from the colour it seems Au) 15 d: light brownish sed 22 d: brownish sed | 60 d: OK |
| Ni amm citrate Ni = 7.6% pH 7–8 | 60 d: OK (green transparent sol.) | 60 d: OK (green transparent sol.) | 60 d: OK (greenish transparent sol.) |
| Ni amm. citrate Ni = 3.8% pH 7–8 | 60 d: OK (green transparent sol.) | 60 d: OK (green transparent sol.) | 60 d: OK (greenish transparent sol.) |
| Cu amm. citrate Cu = 8% pH 7.5–8.5 | 60 d: OK | 60 d: OK | 60 d: OK |
| Fe amm. citrate Fe = 9.8% pH 4.5–5 | 60 d: OK | 8 d: ppt Au on the bottom and on the wall | 60 d: OK |
| Fe amm. citrate Fe = 4.9% | 60 d: OK | 8 d: ppt Au on the bottom and on the | 60 d: OK |

TABLE 4-continued

Comparative tests for Au-acetylcysterine: reference product Na Au Cl$_4$ (Au—Cl)

| Aqueous Sol. % cations and pH | Au-CST/2 (5) | Au—Cl (6) | Au-CST/10 (7) |
|---|---|---|---|
| pH 4.5–5 Fe-CTR/13 | 60 d: OK | wall 8 d: sed. on the bottom (Au) | 60 d: OK |
| Sn glycolate Sn = 7.6% pH 4.5–5 | 60 d: OK | 7 d: ppt Au | 60 d: OK |
| Mn amm. citrate Mn = 4.5% | 60 d: OK | 8 d: very light brownish sed. (= 15 d = 22 d = 29 g) 60 d: light black sed.) | 60 d: OK |
| Sodium metavandate V = 6.8% pH 9.5–10 | 60 d: OK | 60 d: very thin black film on the wall | 60 d: OK |
| V glycolate V = 8% pH 5–5.5 | 60 d: OK | 8 d: brownish sed. on the bottom 60 d: many blue XXX ppt | 22 d: very light black sed. = 60 d |
| Ru glycolate Ru = 6% pH 2–2.5 | 14 d: very light black sed. = 21 d = 28 d 60 d: black ppt and sed on the wall | 7 d: brownish ppt on the bottom and weak sed. on the wall | 7 d: black ppt |
| Ru glycolate Ru = 3% pH 2–2.5 | 60 d: OK | 7 d: very light greenish ppt. (= 14 d = 21 d = 28 d) 60 d: greenish sed. | 7 d: black ppt | d=days
XXX=crystals
ppt=precipitate
sol.=solution

What is claimed is:

1. Composition for colouring ceramic manufactured articles at their surface and to a depth of at least 1 mm in shades from pink to purple to violet, said composition consisting of a solution in water or in mixture of water with a water soluble organic solvent of a monovalent gold thiolate that during the ceramic firing cycle releases corrosive vapours in quantity not higher than 2gSO$_2$/g Au deposited, comprised in the formulas Au—S—R—X and Au—S—R—H where R stands for a linear or branched bivalent radical of aliphatic or aromatic or cycloaliphatic or heterocyclic class, optionally with substituents, selected from the group consisting of aminic, amidic, hydroxylic, carboxylic, hydrocarbylico and carbonylic groups or CONH—, in the chain;

X stands for a monovalent group selected from, the group consisting of —COOH, SO$_2$OH, —OH, —CONH$_2$, —NH$_2$ and —O—P(O) (OH)$_2$, in which H atoms may be replaced by alkyl groups and wherein acid groups may optionally be salified with amines or alkaline or alkaline earth metals and basic groups may optionally be salified with organic acids.

2. The composition as claimed in claim 1, wherein the concentration of gold thiolate in the solution corresponds to a content of 0.1% to 2% of Au, expressed as elemental Au.

3. Composition as claimed in claim 1 wherein the release of corrosive vapours is not higher than 1 gSO$_2$/g Au.

4. The composition as claimed in claim 1, wherein Au thiolate is selected from the group consisting of (N) acetylcysteine; 4-mercaptopyridine; 2-mercaptopyridine; 2-mercaptoacetyl-glycine; mercaptopropionyl-glycine; 3-mercaptopropionyl-glycine; (d,l) mercaptosuccinic acid; cysteine and 2-mercapto-propionic acid.

5. The composition as claimed in claim 1 containing, in addition to Au thiolate, other metal compounds having colouring properties for the ceramic material which are selected from the group consisting of organic or inorganic derivatives of the following elements: Co, Cr, Ni, Ru, Mn, Sb, W, Cu, Fe, Zr, V, Zn, Pd and Sn.

6. The composition as claimed in claim 1, containing in addition to an Au thiolate selected from Au thiolactate and/or Au acetylcysteinate and/or Au mercaptosuccinate, additional metal compounds having colouring properties for the ceramic material which are selected from the group consisting of Cobalt ammonium citrate, Chromium acetate, Chromium ammonium citrate, Nickel ammonium citrate, Ru glycolate, Ru ammonium citrate, Mn ammonium citrate, NaSb tartrate, KSb tartrate, NaW citrate, Cu ammonium citrate, Fe ammonium citrates, sodium metavanadate, V glycolate, V ammonium citrate, Zn ammonium citrate, Pd glycolate, Pd ammonium citrate and Sn glycolate.

7. Process for colouring ceramic manufactured articles obtained by moulding a conventional ceramic mixture, said process using the composition as claimed in claim 1 and consisting in the following steps:

a) drying the article to be coloured at 100° C. to a maximum water residue of 0.5% by wt.;

b) treatment of the dried article with a water solution of the colouring composition in a quantity of 30 to 600 g/m2 of the final coloured surface;

c) equalisation of the treated article at room temperature for 8 hours to homogenize the solution absorption; and d) oven firing according to the conventional ceramic cycle at a temperature of 1,000 to 1,300° C.

8. The process as claimed in claim 5, wherein the solution of the colouring composition, thickened with thickening agents, is applied to the ceramic manufactured article in step (b) by a silk-screen technique.

9. Vitrified stoneware tiles coloured at their surface and to a depth of at least 1 mm, in shades from pink to purple, to violet, by the process as claimed in any of claim 7 and 8.

10. Vitrified stoneware tiles according to claim 9 wherein the surface layer has been removed by smoothing to a depth of 1.5 mm and final polishing.

11. The process as claimed in claim 7, wherein the treatment with a gold thiolate solution is carried out so as to apply 0.1 to 20 g Au, as elemental Au, per m2 of surface to be coloured.

12. Process for colouring ceramic manufactured articles obtained by moulding a conventional ceramic mixture, according to the process of claim 7 wherein a pre-treatment step is carried out on the dried article after step a) and before step b) said pre-treatment step comprises applying up to a maximum quantity of $300g/m_2$ of water to the ceramic manufactured article.

13. Process for colouring ceramic manufactured articles obtained by moulding a conventional ceramic mixture, according to claim 7 wherein a post-treatment step is carried out after step b) and before step c) said post-treatment step comprises applying up to a maximum of $300g/m_2$ of water to the ceramic manufactured article.

* * * * *